(12) United States Patent
Bonen et al.

(10) Patent No.: US 10,802,567 B2
(45) Date of Patent: *Oct. 13, 2020

(54) PERFORMING LOCAL POWER GATING IN A PROCESSOR

(71) Applicant: Intel Corporation, Santa Clara, CA (US)

(72) Inventors: Nadav Bonen, Ofer (IL); Ron Gabor, Hertzliya (IL); Zeev Sperber, Zichron Yackov (IL); Vjekoslav Svilan, Sunnyvale, CA (US); David N. Mackintosh, Mountain View, CA (US); Jose A. Baiocchi Paredes, Santa Clara, CA (US); Naveen Kumar, San Jose, CA (US); Shantanu Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/849,836

(22) Filed: Dec. 21, 2017

(65) Prior Publication Data

US 2018/0129265 A1  May 10, 2018

Related U.S. Application Data

(63) Continuation of application No. 15/647,355, filed on Jul. 12, 2017, which is a continuation of application
(Continued)

(51) Int. Cl.
*G06F 1/3234* (2019.01)
*G06F 1/3287* (2019.01)
(Continued)

(52) U.S. Cl.
CPC .......... *G06F 1/3243* (2013.01); *G06F 1/3287* (2013.01); *G06F 9/30083* (2013.01);
(Continued)

(58) Field of Classification Search
CPC .. G06F 1/3243; G06F 1/3287; G06F 9/30083; G06F 9/3885
See application file for complete search history.

(56) References Cited

U.S. PATENT DOCUMENTS 5,634,131 A * 5/1997 Matter ................. G06F 1/3203
 713/322
5,666,537 A   9/1997 Debnath
(Continued)

OTHER PUBLICATIONS

United States Patent and Trademark Office, Non-Final Office Action dated Oct. 18, 2018 and Reply filed Jan. 16, 2019 in U.S. Appl. No. 15/647,355.
(Continued)

*Primary Examiner* — Vincent H Tran
(74) *Attorney, Agent, or Firm* — Trop, Pruner & Hu, P.C.

(57) ABSTRACT

In an embodiment, the present invention includes an execution unit to execute instructions of a first type, a local power gate circuit coupled to the execution unit to power gate the execution unit while a second execution unit is to execute instructions of a second type, and a controller coupled to the local power gate circuit to cause it to power gate the execution unit when an instruction stream does not include the first type of instructions. Other embodiments are described and claimed.

20 Claims, 11 Drawing Sheets

Related U.S. Application Data

No. 14/960,887, filed on Dec. 7, 2015, now Pat. No. 9,772,674, which is a continuation of application No. 13/534,601, filed on Jun. 27, 2012, now Pat. No. 9,229,524.

(51) Int. Cl.
*G06F 9/30* (2018.01)
*G06F 9/38* (2018.01)

(52) U.S. Cl.
CPC .......... *G06F 9/3869* (2013.01); *G06F 9/3885* (2013.01); *Y02B 70/123* (2013.01); *Y02B 70/126* (2013.01); *Y02D 10/152* (2018.01); *Y02D 10/171* (2018.01)

(56) References Cited

U.S. PATENT DOCUMENTS

| | | | | |
|---|---|---|---|---|
| 5,781,783 | A * | 7/1998 | Gunther | G06F 1/3228 700/295 |
| 5,953,237 | A * | 9/1999 | Indermaur | G06F 1/3203 700/295 |
| 6,219,796 | B1 * | 4/2001 | Bartley | G06F 1/3228 713/320 |
| 6,307,281 | B1 | 10/2001 | Houston | |
| 6,345,362 | B1 | 2/2002 | Bertin et al. | |
| 6,477,654 | B1 | 11/2002 | Dean et al. | |
| 6,564,328 | B1 | 5/2003 | Grochowski et al. | |
| 6,625,740 | B1 | 9/2003 | Dater et al. | |
| 6,848,057 | B2 * | 1/2005 | Hicok | G06F 1/3203 713/320 |
| 6,970,034 | B1 | 11/2005 | Harris | |
| 6,976,182 | B1 * | 12/2005 | Filippo | G06F 1/3203 713/324 |
| 6,983,389 | B1 | 1/2006 | Filippo | |
| 7,134,028 | B2 | 11/2006 | Bose et al. | |
| 7,174,469 | B2 * | 2/2007 | Luick | G06F 1/206 713/300 |
| 7,246,219 | B2 * | 7/2007 | Samra | G06F 1/3203 712/218 |
| 7,389,403 | B1 | 6/2008 | Alpert | |
| 7,428,645 | B2 | 9/2008 | O'Connor | |
| 8,200,371 | B2 * | 6/2012 | Weyland | G06F 1/3296 700/291 |
| 8,291,249 | B2 * | 10/2012 | Branover | G06F 1/3203 713/320 |
| 8,560,869 | B2 | 10/2013 | Allarey | |
| 8,732,490 | B1 * | 5/2014 | O'Connor | G06F 1/3203 713/300 |
| 9,229,524 | B2 * | 1/2016 | Bonen | G06F 1/3243 |
| 9,772,674 | B2 * | 9/2017 | Bonen | G06F 1/3243 |
| 2002/0112193 | A1 | 8/2002 | Altman et al. | |
| 2002/0138777 | A1 * | 9/2002 | Feierbach | G06F 1/3203 713/324 |
| 2003/0196129 | A1 | 10/2003 | Lin | |
| 2004/0017234 | A1 | 1/2004 | Tam | |
| 2004/0117678 | A1 | 6/2004 | Soltis et al. | |
| 2004/0221185 | A1 * | 11/2004 | Bose | G06F 1/3203 713/300 |
| 2006/0075267 | A1 | 4/2006 | Tokue | |
| 2007/0011474 | A1 | 1/2007 | Lee et al. | |
| 2007/0033425 | A1 | 2/2007 | Clark et al. | |
| 2007/0106914 | A1 | 5/2007 | Muthukumar | |
| 2008/0168287 | A1 | 7/2008 | Berry et al. | |
| 2008/0256376 | A1 | 10/2008 | You | |
| 2008/0288799 | A1 * | 11/2008 | Branover | G06F 1/3203 713/323 |
| 2009/0031156 | A1 * | 1/2009 | Barth | G06F 1/3203 713/323 |
| 2009/0150893 | A1 | 6/2009 | Johnson | |
| 2009/0189664 | A1 | 7/2009 | Remington | |
| 2010/0017635 | A1 * | 1/2010 | Barowski | G06F 1/3203 713/322 |
| 2010/0037038 | A1 | 2/2010 | Bieswanger et al. | |
| 2010/0049963 | A1 | 2/2010 | Bell | |
| 2011/0060931 | A1 * | 3/2011 | Radhakrishnan | G06F 1/3203 713/340 |
| 2011/0181343 | A1 | 7/2011 | Myers et al. | |
| 2011/0208505 | A1 | 8/2011 | Mayhew | |
| 2011/0252255 | A1 | 10/2011 | Safford et al. | |
| 2011/0291748 | A1 * | 12/2011 | Li | G06F 1/3228 327/544 |
| 2011/0296149 | A1 | 12/2011 | Carter et al. | |
| 2012/0017198 | A1 | 1/2012 | Ng | |
| 2012/0131370 | A1 * | 5/2012 | Wang | G06F 1/3209 713/323 |
| 2012/0151235 | A1 * | 6/2012 | Nasrullah | G06F 1/26 713/323 |
| 2012/0159074 | A1 | 6/2012 | Sodhi et al. | |
| 2012/0166839 | A1 | 6/2012 | Sodhi et al. | |
| 2012/0200345 | A1 | 8/2012 | Kim | |
| 2012/0226926 | A1 | 9/2012 | Gunther et al. | |
| 2012/0249182 | A1 * | 10/2012 | Sherlekar | G06F 17/5077 326/101 |
| 2012/0290814 | A1 * | 11/2012 | Walker | G06F 13/1663 712/29 |
| 2013/0124890 | A1 | 5/2013 | Priel et al. | |
| 2013/0159750 | A1 | 6/2013 | Branover et al. | |
| 2013/0293282 | A1 | 11/2013 | Rotem et al. | |
| 2013/0305068 | A1 * | 11/2013 | Jung | G06F 1/3206 713/322 |
| 2015/0198992 | A1 | 7/2015 | Kumar et al. | |
| 2015/0348228 | A1 * | 12/2015 | Dorsey | G06F 1/324 345/503 |
| 2016/0020782 | A1 * | 1/2016 | Ruff | G06F 17/2217 341/95 |
| 2016/0048380 | A1 * | 2/2016 | Nakashima | G06F 8/443 717/160 |
| 2017/0371397 | A1 * | 12/2017 | Bonen | G06F 1/3243 |
| 2018/0129266 | A1 | 5/2018 | Bonen et al. | |

OTHER PUBLICATIONS

U.S. Appl. No. 15/647,355, filed Jul. 12, 2017.
U.S. Appl. No. 14/960,887, filed Dec. 7, 2015.
U.S. Appl. No. 13/534,601, filed Sep. 26, 2017.
U.S. Appl. No. 13/247,580, entitled "Controlling Temperature of Multiple Domains of a Multi-Domain Processor," by Avinash Ananthakrishnan, et al., filed Sep. 28, 2011.
International Patent Application No. PCT/US2011/067334, entitled "Methods and Systems to Control Power Gates During an Active State of a Gated Domain Based on Load Conditions of the Gated Domain," by Michael Zelickson, et al, filed Dec. 27, 2011.
International Patent Application No. PCT/US2012/031465, entitled "Controlling Power Gate Circuitry sed on Dynamic Capacitance of a Circuit," by Vjekoslav Svilan, et al., filed Mar. 30, 2012.
International Patent Application No. PCT/US2012/031464, entitled "Dynamically Measuring Power Consumption in a Processor," by Ankush Varma, et al., filed Mar. 30, 2012.
S. Dropsho, et al., "Managing Static Leakage Energy in Microprocessor Functional Units," Nov. 2002, 12 pages.
Z. Hu, et al., "MicroarchitecturalTechniques for Power Gating of Execution Units," 2004, 6 pages.
S. Rele, et al., "Optimizing Static Power Dissipation by Functional Units in Superscalar Processors," 2002, 16 pages.
W. Zhang, et al., "Compiler Support for Reducing Leakage Energy Consumption," 2003, 12 pages.
U.S. Appl. No. 13/326,586, entitled "User Level Control of Power Management Policies," by Krishnakanth V. Sistla, et al., filed Dec. 15, 2011.
U.S. Appl. No. 13/326,605, entitled "Dynamically Modifying a Power/Performance Tradeoff Based on Processor Utilization," by Krishnakanth V. Sistla, et al., filed Dec. 15, 2011.
Klaiber, A., "The Technology Behind Crusoe Processors," Jan. 2000, 18 pages.
J.C. Dehnert, et al., "The Transmeta Code Morphing. Software: Using Speculation, Recovery, and Adaptive Retranslation to Address Real-Life Challenges," 2003, 10 pages.

(56) References Cited

OTHER PUBLICATIONS

H. Homayoun, et al., "Analysis of Functional Unit Power Gating in Embedded Processors," Oct. 2005, 6 pages.
D. Ditzel, "Transmeta's Second Generation Efficeon Microprocessor and Technology Roadmap," Oct. 5, 2004, 28 pages.
U.S. Appl. No. 13/528,548, entitled "Power Gating Functional Units," by Jaewoong Chung, et al., filed Jun. 20, 2012.
U.S. Appl. No. 15/849,838, filed Dec. 21, 2017, entitled "Performing Local Power Gating in a Processor," by Nadav Bonen, et al.
United States Patent and Trademark Office, Final Office Action dated Mar. 3, 2019 and Appeal Brief filed Jul. 26 2019 in U.S. Appl. No. 15/647,355.
United States Patent and Trademark Office, Non-Final Rejection dated Jun. 10, 2019 and Reply filed Sep. 4, 2019 in U.S. Appl. No. 15/849,838.
U.S. Patent and Trademark Office, Office Action dated Oct. 30, 2019 with Reply to Office Action filed Jan. 27, 2020 in U.S. Appl. No. 15/647,355, 41 pages. (C2).
U.S. Patent and Trademark Office, Final Office Action dated Oct. 10, 2019 in U.S. Appl. No. 15/849,838, 23 pages. (C4).
United States Patent and Trademark Office, Final Office Action dated Feb. 26, 2020 in U.S. Appl. No. 15/647,355, 25 pages total.

\* cited by examiner

PERFORMING LOCAL POWER GATING IN A PROCESSOR

This application is a continuation of U.S. patent application Ser. No. 15/647,355, filed Jul. 12, 2017, which is a continuation of U.S. patent application Ser. No. 14/960,887, filed Dec. 7, 2015, now U.S. Pat. No. 9,772,674, issued Sep. 26, 2017, which is a continuation of U.S. patent application Ser. No. 13/534,601, filed Jun. 27, 2012, now U.S. Pat. No. 9,229,524, issued Jan. 5, 2016, the content of which is hereby incorporated by reference.

BACKGROUND

To aid in power management of an integrated circuit (IC) such as a multicore processor, the IC may include one or more gated cores for which power may be selectively applied and disrupted, referred to as power gating. Conventionally, power gating is used to intermittently disable or deactivate an entire core to conserve power when circuitry of the gated core is not needed. This may be referred to as placing the gated core in a sleep mode or state. However, such power saving measures are conservative and as a result power consumption of the processor, particularly as a result of leakage current losses, is still higher than optimal.

DETAILED DESCRIPTION

In various embodiments, dynamic local power gating (LPG) allows shutting the power for one or more specific domains inside a core of a processor while the core is running. More specifically, embodiments may enable power to certain domains of a core to be turned on and off dynamically based on usage. Embodiments may also perform this power control such that there is minimal or no effect on normal execution or performance of the core, as well as its correctness (e.g., by not introducing deadlock scenarios).

Local power gating may occur due to typical scenarios in which certain regions of the core are unutilized based on software needs. For example, a 2D engine is not used in a general processing on a graphics processing unit (GPGPU) scenario. In addition, certain processor hardware is added for high performance scenarios, while some software may not utilize that hardware. One example of this situation is one or more vector execution units that operate on vector-sized data (e.g., a vector width datum including a plurality of individual data elements).

Embodiments thus enable local power gating to take advantage of the inefficiencies of underutilized hardware to save leakage power, and either lower power consumption or provide additional headroom for a turbo frequency of operation.

Local power gating saves the leakage power of unutilized core areas by separating the power plane of different areas and logic of the core. As will be described, a local power gate can be implemented via a switch or other circuit controlled by a control logic to turn the power on and off. Thus power can be delivered by routing it to a portion of the processor's logic through a transistor or other switch (referred to herein as an embedded power gate (EPG)). This transistor, when disabled, saves the leakage of the gated logic. Embodiments may enable a gradual turn on, which may take several cycles, to avoid charge sharing and power noise injection to the functioning core. Then on power down, outputs are floating and can be gated/isolated to avoid impact on the rest of the functioning core. Furthermore, the voltage drop on the EPG may be compensated by raising the core voltage when EPGs that provide power to at least certain units of the core are on. In some situations dropping the voltage to a domain loses the data held in state saving circuits. Depending on the logic, this issue can be resolved by using reset and save/restore procedures.

In various embodiments, local power gate circuitry coupled between a voltage distribution network and a portion or domain of a semiconductor die such as a processor can be controlled to correctly achieve minimal over-voltage and therefore minimize overall power consumption when such domains are not active.

Figure 1:
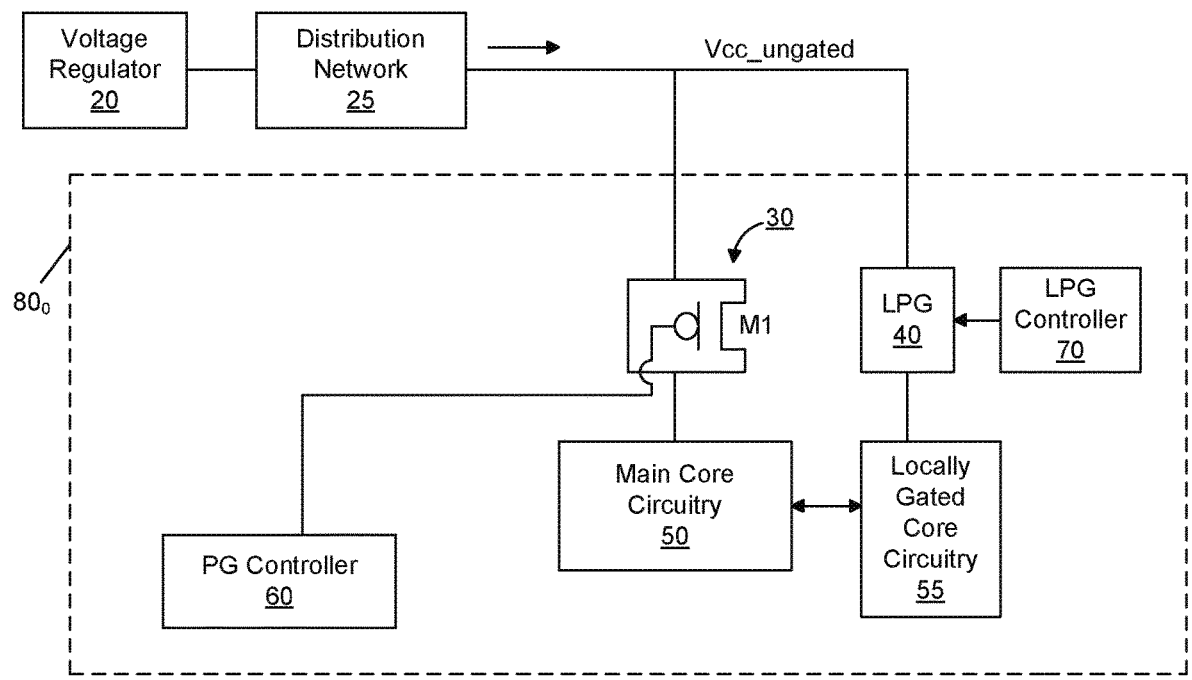
FIG. 1 is a block diagram of a portion of a power distribution system in accordance with an embodiment of the present invention.

Referring now to FIG. 1, shown is a block diagram of a portion of a power distribution system in accordance with an embodiment of the present invention. As shown in FIG. 1, system 10 may be used to provide a regulated voltage to an integrated circuit such as a processor. Although the embodiments described herein are with regard to a multicore processor, understand the scope of the present invention is not limited in this regard, and other embodiments may be used in connection with other integrated circuits or other electronic devices that benefit from a regulated and controllable voltage delivered with a high degree of control.

As seen in FIG. 1, system 10 includes a voltage regulator 20. In various embodiments, voltage regulator 20 may be an off-chip regulator that provides a regulated voltage to a distribution network 25. First distribution network 25 may include the circuitry such as wires, coupling elements and so forth that provide the regulated voltage (Vcc_ungated) to circuitry within the processor via one or more pins of the processor. In turn, the voltage output from distribution network 25 may be provided through a power gate circuit 30, which may be a core-wide power gate, also referred to as an embedded power gate (EPG). As shown in FIG. 1 EPG 30 may be part of a core $80_0$. While certain components of this single core are shown and described in FIG. 1, understand that embodiments apply equally to a multicore processor in which a plurality of such cores generally similarly adapted as shown in FIG. 1 may be present.

In addition to EPG 30, an additional power gate, referred herein as a local power gate circuit (LPG) 40 is also present. As seen, this separate local power gate circuit may similarly receive the incoming regulated supply voltage Vcc_ungated.

Core $80_0$ of FIG. 1 may be arranged such that different portions of the overall core circuitry can be implemented in separate power domains. For purposes of illustration FIG. 1 shows a first portion of main core circuitry 50 that is present in a first power domain and that receives a supply voltage via EPG 30 and a second portion of the core circuitry corresponding to LPG locally gated core circuitry 55 that in turn is of a separate power domain and receives a supply voltage via LPG 40. Note that although a single LPG and a corresponding single power plane coupled to receive a supply voltage from this LPG is shown, the scope of the present invention is not limited in this regard and multiple such local power gate circuits and corresponding power planes can be present in other embodiments. In the arrangement of FIG. 1, main core circuitry portion 50 may include all portions of core circuitry other than the LPG locally gated core circuitry 55, which in an embodiment may correspond to a vector processing unit (VPU) or other such functional unit.

Each of first and second power gate circuits 30 and 40 may be implemented as one or more switching devices such as a metal oxide semiconductor field effect transistor (MOSFET) (e.g., transistor M1 shown in power gate circuit 30). In one implementation, the MOSFETs may be P-channel MOSFETs (PMOS) although other implementations may use N-channel MOSFETs (NMOS) or other such switching devices. For the circuit shown in FIG. 1, PMOS device M1 of first power gate circuit 30 may be gated by a control signal received from a first controller 60 at a gate terminal of the PMOS device. Thus when enabled, the regulated voltage may be provided through power gate circuit 30, e.g., from a source terminal to a drain terminal of MOSFET M1. The enabled switch thus provides a supply voltage. As seen, this power gate voltage may then be provided to main core circuitry 50. Similar control of LPG 40 can be realized via LPG controller 70 to thus provide a regulated supply voltage to LPG locally gated core circuitry 55 when LPG 40 is enabled. As will be described further below, controllers 60 and 70 may operate to control these power gate switches based on various inputs. In general, the inputs may correspond to information regarding operating parameters of the processor, and its sub-components including activity level, various overheads, fixed values and so forth, as will be described further below.

Figure 2:
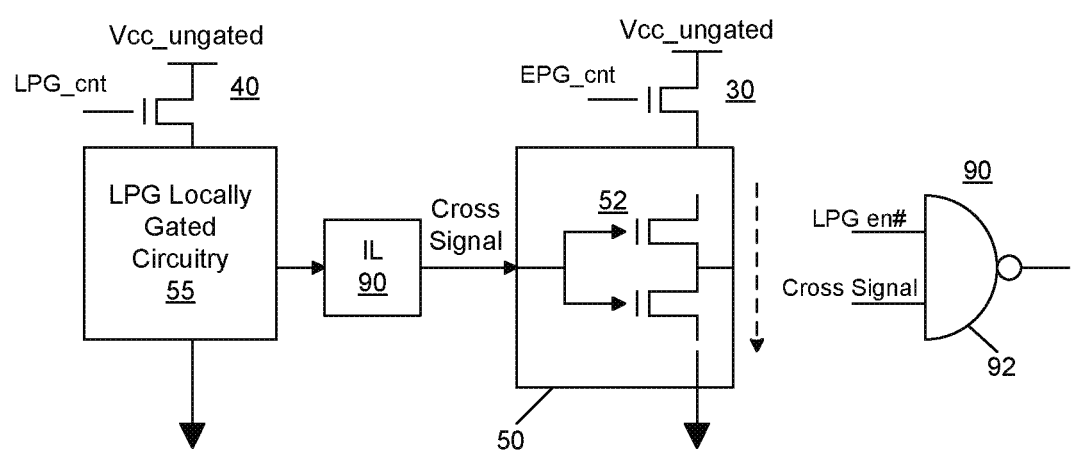
FIG. 2 is a block diagram of interconnection between core circuitry and a functional unit that is subject to local power gating in accordance with one embodiment of the present invention.

Referring now to FIG. 2, shown are further details of interconnection between core circuitry generally and a functional unit that is subject to local power gating. In the embodiment of FIG. 2, this power gated circuitry may correspond to a VPU although the scope of the present invention is not limited in this regard. Further, understand that while only a single such locally power gated circuit is shown, additional such locally power gated circuits may be present and can be implemented in one or more separate power domains than a remainder of the core circuitry.

As seen in FIG. 2, local power gate circuit 40 when enabled provides an ungated supply voltage Vcc_ungated to LPG locally gated core circuitry 55. As seen, power gate circuit 40 is under control of an enable signal LPG_cnt from an LPG controller (not shown for ease of illustration in FIG. 2).

A remaining portion of the main core circuitry 50 may similarly receive supply voltage when an active EPG_cnt control signal is provided to power gate circuit 30.

Because locally gated core circuitry 55 may be routinely disabled, cross signals communicated between this portion of a core and a remainder of the core circuitry could be affected by noise or other deleterious effects of floating voltages on such cross signals when the circuit is disabled. In turn, such floating values could also cause a rush through current. To illustrate this potential concern, an inverter 52 within main core circuitry 50 is shown. This circuit could be affected by a rush-though current due to such a floating voltage. Accordingly, embodiments may provide an isolation logic 90 to logically isolate circuit 55 from the remainder of main core circuitry 50 when it is not enabled. To this end, each individual cross signal (communicated in either direction) may traverse logic circuitry such as a logic circuit 92 of isolation logic 90 that thus forces a known value of the signal provided to one or the other of circuit 55 and the remainder of main core circuitry 50. Note that this isolation logic can be AND or OR type, depending on the required isolation value. In an embodiment, isolation logic 90 is powered by EPG 30. Although shown at this high level in the embodiment of FIG. 2, understand the scope of the present invention is not limited in this regard.

Embodiments may include detection logic to detect upcoming usage of gated logic. Since power up takes time, embodiments may detect this usage as early as possible to prevent performance loss (which would typically involve stalling the machine until the unit is ready). In some embodiments this can be done at an early detection stage, or may be done speculatively by a predictor.

Embodiments may further include decision logic to control the policy of entering into a local power save state. In various embodiments this logic can be implemented by a timer with a watchdog or a task-based predictor. In addition, a finite state machine (FSM) logic may define and control state transitions (power on/off, etc.) and notify the power monitors that power is saved.

For purposes of illustration herein, a power domain to be controlled to be selectively enabled or disabled based on usage may be a VPU. However understand that various domains can be power gated via a local power gate. In an embodiment a VPU may include floating point execution units (two 128 bit ports) and the register file, and thus may contribute to a large portion of core leakage. As such, embodiments may contribute to substantial total core power saving with minimal performance loss.

In an embodiment, multiple LPG power states can be defined. In one embodiment, a first state, referred to as a LC0 or normal operation, is a state in which the EPG is on; a second state, referred to as a LC3, is a state in which the gated circuit is at a retention voltage. In this case, the gated circuit interface is isolated and all data is isolated (both inputs and outputs). Finally a third state, referred to as a LC6, is a state in which the gated circuit is fully power gated. In this case the interface is isolated and the local gated circuit power is off. To realize this state, a reset and save/restore of the registers may occur.

The motivation for providing an LC3 state is to provide power saving with little penalty for applications with high VPU code usage. As an example, the LC3 power up penalty may be as low as 3.2 nanoseconds (ns) (~16 cycles at 5 GHz) while for the LC6 save and restore, the penalty can be hundreds of cycles. Note that in other implementations, by not applying local power gating to the register file, a LC3 state can be avoided, thus saving on design complexity. In some embodiments LC3 saves 70% of the gated circuit leakage when the core is at normal voltage.

In various embodiments, detection can be done during instruction decoding. As an example, a dedicated decoder may detect VPU instructions or memory instructions using a VPU register. When detected, the decoder can signal the LPG controller, which turns the power on and unlocks isolation between this gated circuitry and a remainder of the core circuitry. In some embodiments, the controller will stall the machine if the instruction passes the instruction queue and the VPU is not yet powered up. When exiting the LC6 state, the controller may also reset the logic and send an interrupt to an agent that in turn restores the contents of the VPU registers. In an embodiment, this agent may be low level system software or firmware (such as code morphing software (CMS)). Note however that the ability to take interrupts and save/restore register state could be part of any low level software. For a simple form of LPG which only uses a hardware timer to enter low power states, and which powers back up on demand, such low level software can service these interrupts. In some embodiments, providing a DBT allows a more sophisticated mechanism for learning and predicting when a given resource can be power gated in an eager manner with maximum efficiency. Note that an alternative detection method may be a power on hint provided by CMS. The hint can be provided early enough so exiting the save state will not stall the machine.

The detection logic may also identify when the pipeline is free of VPU instructions. Unlike most instructions that complete after a known number of cycles, a memory instruction may have unpredictable latency. In case of load of a VPU register with a cache miss, the memory logic (such as a miss tracker in the memory ordering system) may continue to keep signaling the LPG controller that a VPU load is in process to avoid turning off the logic before the load completes and writes to the register.

Figure 3:
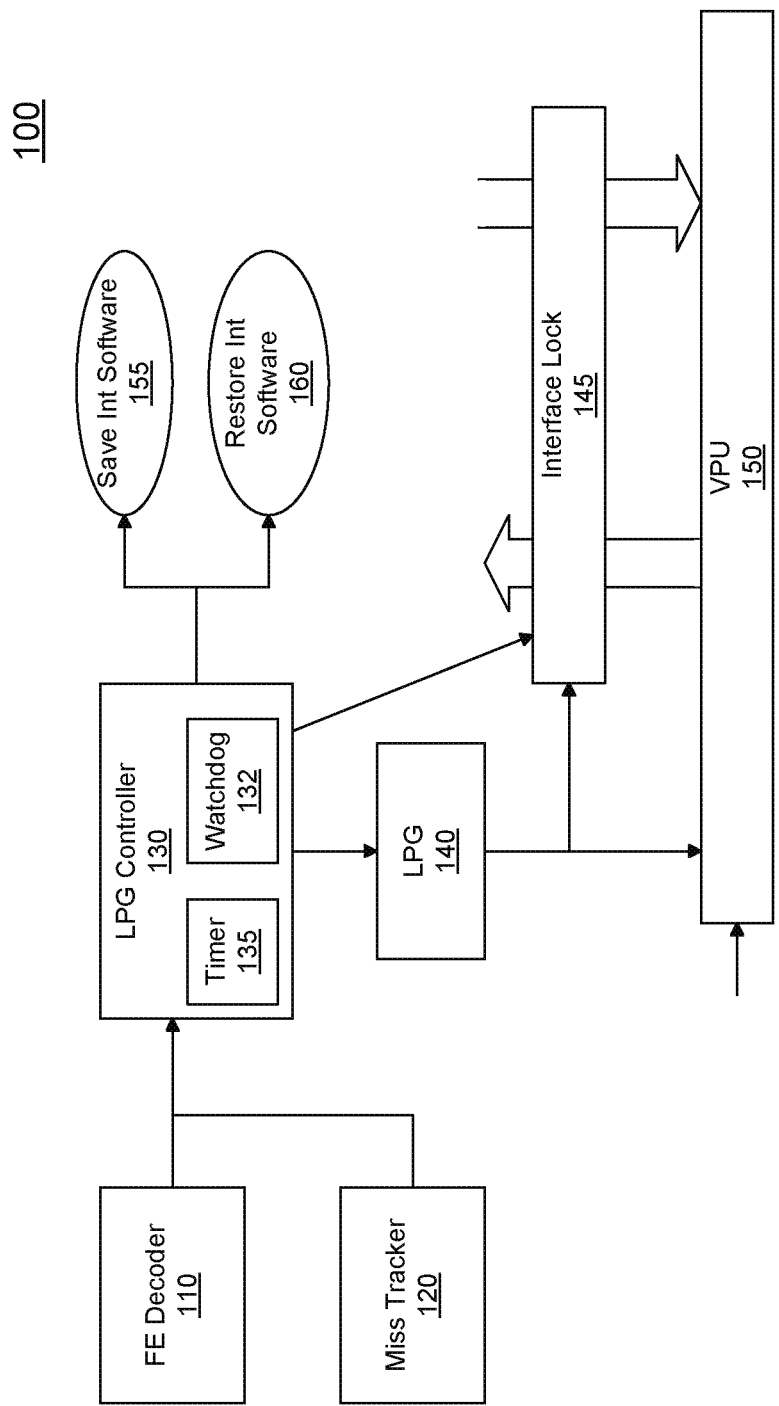
FIG. 3 is a block diagram of a local power gate (LPG) arrangement in accordance with an embodiment of the present invention.

Referring now to FIG. 3, shown is a block diagram of a LPG arrangement in accordance with an embodiment of the present invention. As shown in FIG. 3, a processor 100 can include various elements. For ease of illustration, only components involved in performing LPG operations are shown. Specifically, the embodiment of FIG. 3 is with regard to gating of a VPU 150 which can have various components for performing single instruction multiple data (SIMD) operations including registers, execution units, control logic and so forth. VPU 150 may be powered on when an LPG 140 is enabled to provide power to the unit. Otherwise, VPU may be powered off and can be isolated from other circuitry of a core via an interface lock 145, which may provide logic isolation such as that shown in FIG. 2.

As further seen in FIG. 3, LPG control can be by way of an LPG controller 130 that includes a timer 135. FIG. 3 shows an embodiment in which a pure hardware approach is provided to power gate VPU 150 depending on whether VPU instructions are present in the machine. Specifically a front end decoder 110 may receive incoming instructions and decode them. When a vector-based instruction is decoded in decoder 110, an indication signal can be sent to controller 130 to thus indicate the presence of this vector instruction in the machine. When this indication is received in LPG controller 130, the timer may be reset to an initial value. In an embodiment, timer 135 may be configured as a countdown timer that counts from its initial value down to a zero value. When the zero value is reached, indicating a lack of a vector instruction for a certain length of time (e.g., as measured in cycles) LPG controller 130 may trigger power gate circuitry 140 to trigger to thus cause VPU 150 to enter into a given local low power state.

As further seen, a miss tracker 120 is also present. This tracker may maintain track of pending memory operations that implicate vector data and which are in flight (that is, a memory request has not yet been fulfilled). The presence of entries in this tracker may similarly cause an indication signal to be sent to LPG controller 130 to similarly cause timer 135 to be reset and may be released from reset only when the miss tracker is cleared. While shown with these specific detection logics, understand the scope of the present invention is not limited in this regard.

Still referring to FIG. 3, LPG controller 130, in addition to controlling LPG 140, may further provide control signals to various interrupt handlers. As shown in FIG. 3, a first interrupt handler 155 may be a state save interrupt handler, which can be generated by hardware to cause the software to save the state present in VPU 150 prior to entry into a deep low power state (e.g., LC6). Similarly, when LPG controller 130 is to cause LPG 140 to return from the deep low power state provide power to thus power on VPU 150, controller 130 may send a control signal to a second interrupt handler, namely a restore interrupt handler 160, which then may cause software to restore previously saved state for the VPU when it is again powered up. Although shown at this high level in the embodiment of FIG. 3, understand the scope of the present invention is not limited in this regard. For example, OS or microcode or any other means may serve the save/restore request.

Decision logic of the LPG controller may be implemented in alternate algorithms. For example, a pure hardware approach or a hardware/software co-design approach could be used. In an embodiment, the pure hardware approach contains a timer and a watchdog 132 as just described. The timer counts down when no VPU instructions are in the pipeline and is reset to its initial value if a VPU instruction is in the pipeline. When the timer expires, the LPG can transient to a save state. In an embodiment there can be two controls: one for LC3 and one for LC6, each with different timer values and actions. The watchdog role is to adjust the timer value to limit performance loss on the one hand while gaining more power on the other. In an embodiment, parameters to be considered may include a maximum allowable performance loss and watchdog responsiveness (via an averaging interval).

In an embodiment the watchdog algorithm may be implemented as follows. After a predetermined interval, the performance loss can be calculated. If the loss is higher than a threshold level, the timer value can be adjusted, e.g., doubled. If instead this loss is lower than the threshold value, the timer value can be adjusted in the other direction, e.g., halved. Also in an embodiment, there can be maximum and minimum possible timer values to prevent over and under shoot.

In an embodiment the LPG controller may be configured to ensure entry into the LC0 state on reset, entering and exiting LC3/6 according to the detection and decision policy. In an embodiment, various state changes and interactions can be taken into account, as set forth in Table 1:

TABLE 1

| Next state\Present state | LC3 | LC6 |
|---|---|---|
| LC3 | NA | NA, no action |
| LC6 | Exit LC3, Enter LC6 | NA |
| C6 | Exit LC3, Enter C6 | C6 without VPU save (VPU registers are saved to C6 area) |
| C0 | NA | C0 without VPU restore |

Table 1 thus shows, in a first row a present state of a given functional unit, and the corresponding actions to be taken upon transition to a different power state (shown in the second to fifth row of Table 1). In an embodiment, note that the local power states LC0, LC3 and LC6 may generally correspond to and have the same operational characteristics of the core power states of an Advanced Configuration and Power Interface (ACPI) specification such as the Advanced Configuration and Power Interface Specification, revision 3.0b, Oct. 10, 2006. That is, the LC0 state may generally correspond to the state of C0, while the LC3 state may generally correspond to the C3 state, and the LC6 state may generally correspond to the C6 state, in an embodiment.

In another embodiment, core leakage power can be reduced by gating a VPU for mainstream workloads that do not use, e.g., 256 b vector instructions. In an embodiment, the power gating can be done dynamically and automatically. Power will be initially off until a gated unit is needed for execution. As an example, power to a gated unit will be turned on when a 256 b instruction is detected (e.g., at allocation), or when a dedicated power-up instruction (which may be a micro-operation (pop)) is fetched as part of a microcode flow. Again, power is turned off when there is no 256 b instruction in the pipeline and there are no values to be maintained in the register file (e.g., all vector bits are zero). In some embodiments, control logic may provide for hysteresis on power-down to prevent frequent power-up/down cases.

In some embodiments, a dedicated op may be provided to allow microcode to conditionally request a power-gate event inside long flows. In an embodiment, detector logic can detect three conditions to be present before turning the power off. First, no op/instruction is present in the pipeline that uses a gated unit. Note that an out-of-order core may speculatively have many instructions in the pipeline, waiting for execution or being replayed, which can be detected via detection logic. Second, all register file vector bits (power gated bits) are known to be zero in an embodiment that does not include a save/restore mechanism and to maximize power saving by powering off the register file only when the power gated bits are all zero. This happens for workloads that do not use vector instructions, or for kernels that zero the state (e.g., using a VZEROUPPER instruction). When all gated register bits are zero, logic can be used to force a zero on read of any value. Third, a hysteresis timer may have elapsed to prevent frequent on/off scenarios to avoid an excessive turn-on timeout. Furthermore, different units may be power gated separately, for example VPU execution units may be powered off, while register file remains powered on to maintain values.

Turn-on logic can be present to enable gradually turning on power, e.g., according to multiple stages such as a first stage to turn power on (charge up transistors), which may be a short phase in the magnitude of a few tens of clocks. In this period the core stalls the thread that has the vector instruction, allowing one or more other threads to continue. Once the turn-on time has elapsed, the stall is released and the requesting thread continues. The turn-on logic may further include voltage compensation which can be used, e.g., in heavy floating-point (FP) applications, to adjust the voltage to compensate for IR drop on the power gate. This IR drop occurs in a high current situation and may arise on any FP workload. If such heavy workload is detected, execution can be throttled such that high current will not be drawn while the voltage is adjusted. Once voltage is adjusted (raised), the throttling is removed.

Note that this turn on stage can take several microseconds, during which the core may not be stalled to avoid dead-lock scenarios (as the power control unit is to receive information from various components of the core to enable completion of a voltage increase request). That is, a deadlock could occur if the core is stalled as the power control unit seeks to access core microcode before completing the voltage request.

Figure 4:
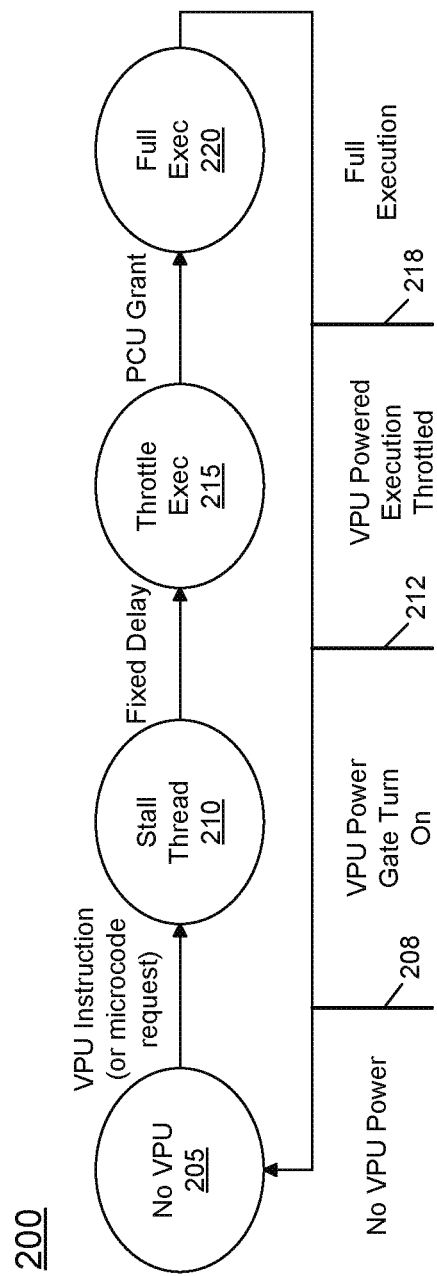
FIG. 4 is a graphical illustration of operations in performing local power gating in accordance with an embodiment of the present invention.

FIG. 4 shows a graphical illustration of operations in performing local power gating in accordance with an embodiment of the present invention. In FIG. 4, during a time epoch 200, a given locally power gated unit, e.g., a vector-based circuit such as a VPU can proceed from a power off state to a fully powered on state. More specifically, as shown at a first time instant 205, the unit is powered off, as there are no vector instructions in the machine. When such an instruction is received (e.g., is received and decoded in a front end decoder), or responsive to control instructions such as a microcode request, a power gate for this unit is turned on at a time instant 208. Then a stall state may proceed, exemplified at a time instant 210. This stalling of a thread that is to use this unit may occur during a power turn on state which may be implemented for some number of cycles (e.g. tens of cycles). Thereafter a throttled power state may be entered at a time instant 212. During this throttled power state, the execution unit may execute instructions at a lower rate, e.g., according to a throttle rate, as shown at time instant 215. As described above, this throttling of execution may be performed when there is a high current workload detected in the processor, to avoid an undesired IR drop condition. Thereafter, a full execution state may be entered at a time instant 218, and accordingly as seen at time instant 220 full execution can occur within the vector unit. Then after a predetermined period of time corresponding to a hysteresis period in which no vector instructions are received and, no non-zero values are present in the vector register file, again power can be removed from the vector unit. Although shown at this high level in the embodiment of FIG. 4, understand that the scope of the present invention is not limited in this regard.

Figure 5:
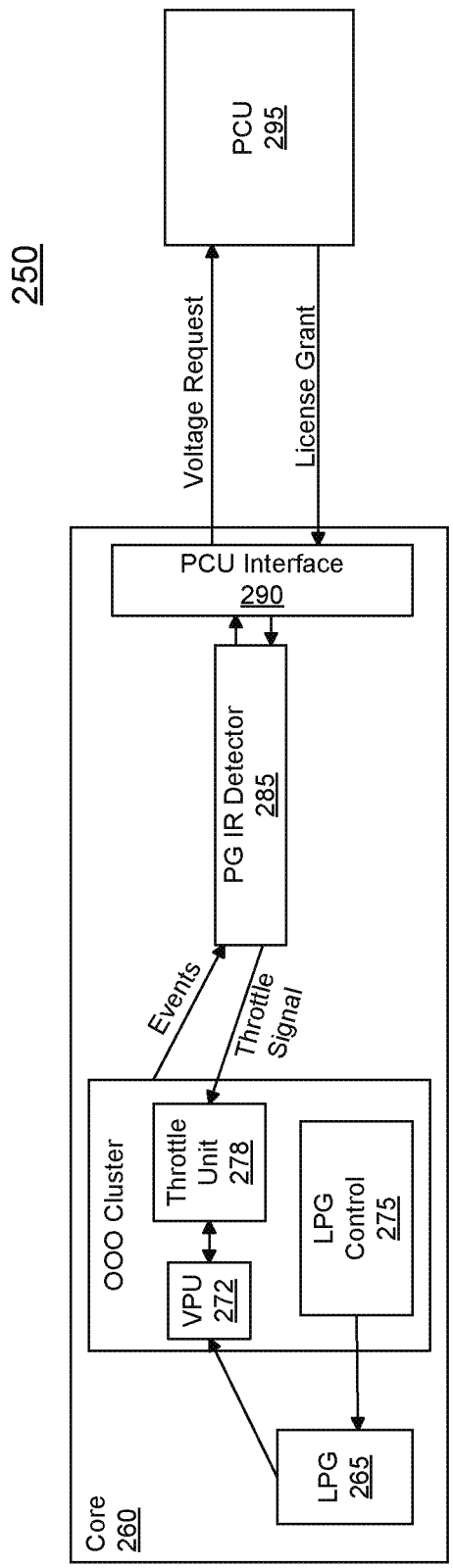
FIG. 5 is a high level view of a portion of a processor in accordance with an embodiment of the present invention.

Referring now to FIG. 5, shown is a high level view of a portion of a processor in accordance with an embodiment of the present invention. As shown in FIG. 5, a processor 250 includes a core 260 in communication with a power control unit (PCU) 295. In general, PCU 295 may be configured to monitor the state of the processor and control various logic of processor including one or more cores to enter into low power states when available and also to receive requests for higher power states, such as a so-called turbo mode in which the processor can execute at a higher than guaranteed frequency.

As seen in FIG. 5, core 200 may include a local power gate 265 which may control whether power is provided to a corresponding power gated logic, which in the embodiment shown may be a vector processing unit 272 of an out of order (OOO) cluster 270. As further seen, cluster 270 may include a LPG controller 275 which is used to provide control signals to enable power gate 265 to either provide or gate power to its corresponding powered unit, here VPU 272. In addition, cluster 270 may include a throttle unit 278 which may receive a control signal from an IR detector 285 which can detect a high current workload to thus throttle execution in VPU 272 until an appropriate voltage is provided to the core. As seen, execution events, e.g., from various units of the core, may be provided to IR detector 285. This detector may in turn be in communication with PCU 295, such as via a request signal to request a higher voltage when a given current consumption level exists in the core. In turn PCU 295 can receive information and generate signals to cause higher or lower voltages to be provided to the core. When an appropriate voltage is obtained, a license grant signal can be sent from PCU 295 via PCU interface 290. Note that in some implementations this license grant may be provided by the PCU without a higher voltage, based on the PCU's knowledge of overall processor power consumption. In turn, this information can be passed to IR detector 285 which in turn can communicate to throttle unit 278 to thus enable VPU 272 to no longer be throttled and operate at full capability. Although shown at this high level in the embodiment of FIG. 5, understand the scope of the present invention is not limited in this regard.

Figure 6:
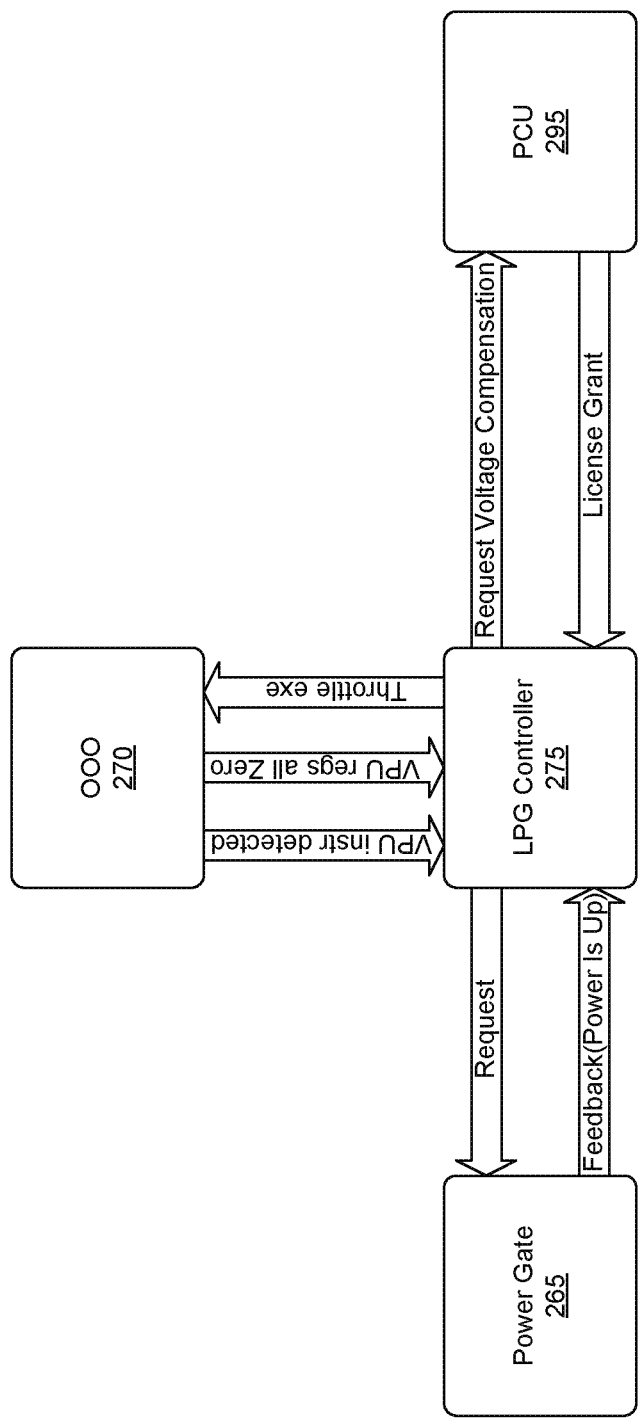
FIG. 6 is a further view of a core arrangement with a LPG controller in accordance with one embodiment of the present invention.

FIG. 6 shows a further view of this core arrangement with LPG controller 275 providing information to PCU 295 and also receiving information from the PCU. Specifically, LPG controller 275 may send a request for voltage compensation to the PCU and in turn receive a license grant that indicates that the request has been granted and the voltage is at the requested level such that a throttle of a logic unit can be removed (or that there is not a need for a higher voltage).

As further seen, LPG controller 275 may further be in communication with OOO logic 270. As seen, when a vector instruction is detected, OOO logic 270 can send a detection signal to in turn cause LPG controller 275 to send a request to a power gate circuitry 265 to power up the vector unit. In addition, OOO logic 270 can send a reset signal to LPG controller 275 which indicates that all vector registers are at a zero state such that LPG controller 275 can cause power gate circuitry 265 to disable the vector unit. Similarly, in a high current situation, LPG controller 275 can communicate a throttle signal to OOO logic 270 to thus throttle execution of one or more execution units. Note that this throttle of execution may not be performed for every turn-on and instead may be applied only based on the scenario (e.g., when a high current workload is detected). Finally as seen also in FIG. 6, a feedback signal can be sent from power gate circuitry 265 to LPG controller 275 to indicate when the power gating operation is terminated and power is returned to the vector unit. Embodiments may realize high performance by minimizing voltage ramping conditions (detecting high current cases) and putting hysteresis to minimize frequent on/off cases. Correctness and dead-lock avoidance may thus be achieved.

As described above, utilization of different resources within the core varies over time. The functionality provided by a given resource may not be exploited by all software, and thus the resource can be subjected to being frequently unused, yet still drawing leakage power. Even when executing resource-aware software, the usage pattern is often sporadic, leaving the resource idle for large amounts of time.

Control schemes for LPG may encounter some difficulty due to the physics of power gating itself. That is, there is a defined latency between initiating a power-off and actually realizing the energy savings. There is likewise latency between initiating a power-on and the resource being ready for use (possibly stalling the pipeline and saving/restoring register context). Together these represent a switching cost. This cost defines the minimum amount of time for which the resource is to be unused in order to minimize the performance impact of stalls. These stalls can vary in length depending on the level of LPG applied, from tens to hundreds of cycles or more.

A hardware-only LPG scheme cannot know when software intends to use a resource. Hardware can decide to power gate the resource, but it will be forced to stall when an instruction that uses the resource is present in a front end unit. In this way the hardware exhibits reactive, rather than just-in-time behavior.

Hardware solutions can aim to minimize performance impact using a counter. For example, if powering off/on the VPU takes 100 cycles to go between LC6 (the lowest power level) and LC0 (fully powered-on), it can be guaranteed that any region of execution that does not use the VPU for 20,000 cycles can be forced to LC6 with less than 1% performance penalty (200 cycles for LC6 to LC0 and back). The scheme can thus count non-VPU instructions and initiate LC6 when the counter reaches 20,000. This scheme can miss many opportunities for gating when non-VPU windows of execution are 20,000 cycles or less. If all windows happen to be exactly 20,000 cycles, the scheme will always pay the 200 cycle stalling cost and save no power at all. Windows larger than 20,000 will save power only after the first 20,000 cycles.

The same situation occurs with finer-grained windows of non-VPU usage and less aggressive LPG modes. LC3, for example, may save less power than LC6 but only incur a 16 cycle stall to return to LC0. LC3 retains register bank state, and therefore consumes much less switching time. A VPU-heavy workload which has only small non-VPU regions will suffer in the same way with a counter-based LC3 scheme.

In various embodiments, the power savings of LPG can be balanced against the power cost of its controlling scheme. Aggressive use of LPG can save additional power over that offered by a hardware only scheme. To realize this aggressive LPG control, embodiments may provide a non-VPU oracle to control gating whilst minimizing stall cycles.

Embodiments can be applied to any dynamic binary translation (DBT) system, such as a hardware/software co-designed processor. In such a processor, software is executed by translating it at the basic-block level into code of a native instruction set. This translation is performed by a software layer, which executes on the core itself. The software layer is therefore a dynamic binary translator. An analogous situation is that of a Java just-in-time compiler, which translates Java bytecode into native binary code understood by the underlying machine.

In such embodiments, the binary translator can perform predictions and instruct hardware when to enter and exit LPG states. One embodiment of this prediction is by means of event tracker hardware, which serves as the example for this discussion. Another embodiment is by means of static and/or dynamic analysis of the program to determine regions of code that do not require a given resource.

Figure 7:
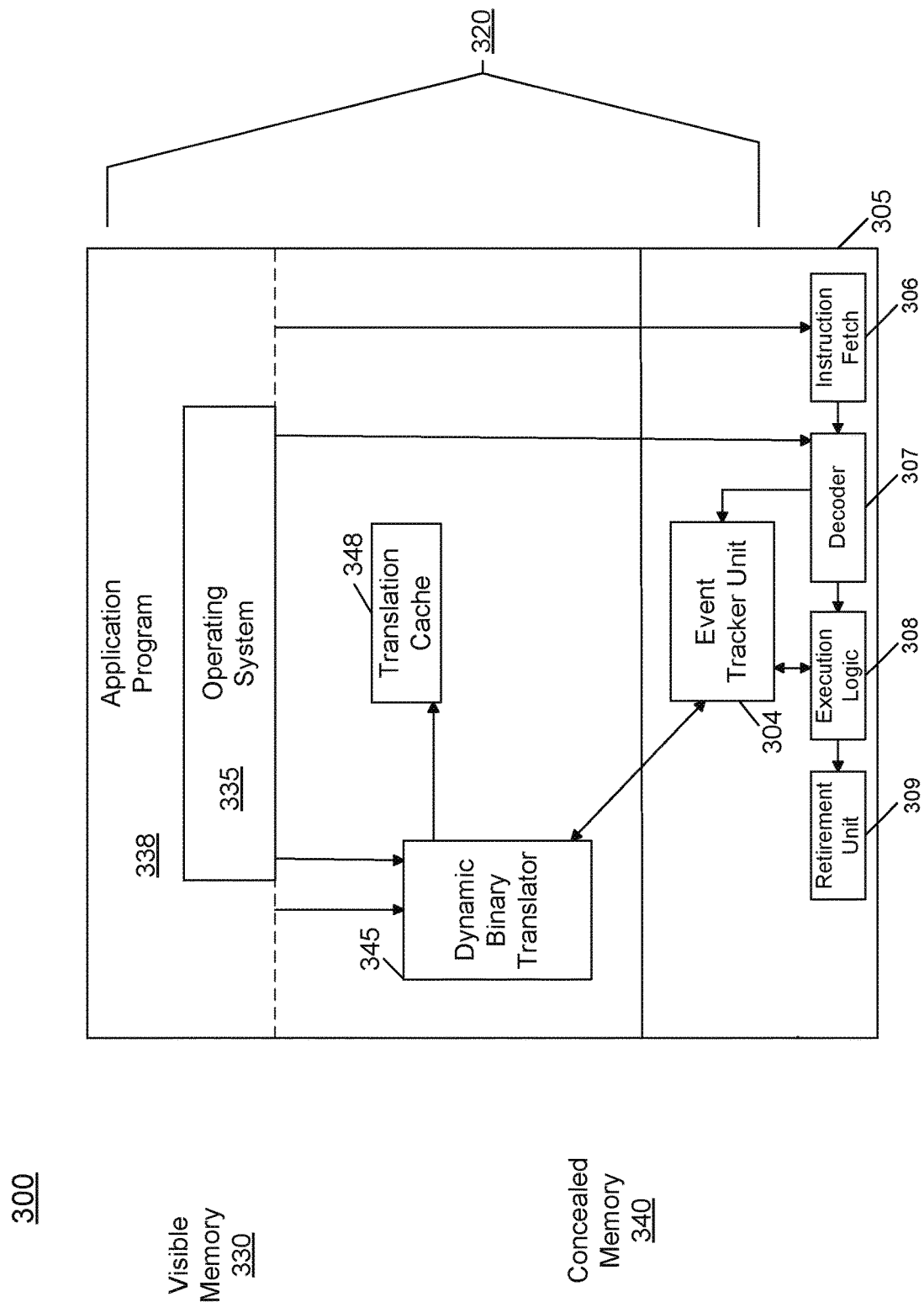
FIG. 7 is a block diagram of a co-design environment including a processor and a memory in accordance with one embodiment of the present invention.

Some embodiments can be implemented in a hardware/software co-design processor that provides for optimization of received code for the processor and can leverage knowledge of the units used in execution of such code to permit aggressive local power gating in accordance with an embodiment of the present invention. Referring now to FIG. 7, a co-design environment 300 includes a processor 305 and a memory 320 which in one embodiment may be a system memory such as a dynamic random access memory (DRAM). As seen, processor 305 may have a given micro-architecture and may be coupled to memory 320 by way of, e.g., a point-to-point interconnect, bus or in other such manner. As seen, processor 305 which may be a co-design processor includes front end units such as an instruction fetcher 306 that can receive instructions directly from the OS or application programs. These instructions, which may be macro-instructions, e.g., corresponding to user-level instructions of an application program can be decoded using a decoder 307, which may operate to decode the instructions and access corresponding ops, e.g., present in a microcode storage of processor 305. In turn, decoder 307 may provide the pops to one or more execution units 308, which may include various arithmetic logic units (ALUs), vector processing units, specialized hardware and other types of computation units. Results from these instructions may be provided to a retirement unit 309, which operates to retire the instructions to thus store the results to an architectural state of the processor in program order, if no fault or exceptions occurred. While described as an in-order machine, embodiments can equally be implemented using an out-of-order machine.

In a visible portion of memory 320, namely a first portion 330, one or more operating systems 335 and application programs 338 may be stored. This portion is termed "visible" as it can be visible to user-level code (i.e., the application program 338) and visible to the OS (both OS 535 and program 338). Depending on the type of instructions to be executed in these programs, communication may be directly with processor 305, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 340, in order to provide translated code to processor 305. Specifically, as seen, both OS 335 and application program 338 may communicate with an emulation engine 345 (also referred to herein as a dynamic binary translator (DBT)), which may include a runtime execution unit including interpretation, translation and optimization mechanisms and thus can be the engine for binary translator software. Note that concealed memory 340 is not visible or accessible to the OS or application programs. Dynamic binary translator 345 may thus provide code and address information to a translation cache 348, which may include translated code that can be provided to processor 305 for execution. In one embodiment, code stored in translation cache 348 may be encrypted. This translated code may be written and optimized for the underlying micro-architecture of the processor, e.g., target ISA code.

As further seen in FIG. 7, an event tracker unit 304 within the hardware may also be present. As seen, the incoming instructions from decoder 307 may further be received in event tracker unit 304. In general, event tracker unit 304 may provide hardware to perform analysis and may include various storages, such as various arrays, registers and so forth to identify power gate instructions, distances between selected such power gate instruction, and to provide tracking of the success and/or failure of a given such power gate instruction. Event tracker unit 304 may provide such information to dynamic binary translator 345 for use in performing code translations and optimizations in accordance with an embodiment of the present invention.

The translated code created by the binary translator corresponds to the basic blocks of the source software. Each of these blocks may include one or more translations, which is a unit of a basic block including one or more instructions. In turn, each translation includes a power gate (PG) instruction which (among other duties) notifies hardware as to whether or not the remainder of the translation will use VPU instructions. In an embodiment, a PG instruction may be provided as a first instruction of each translation and can include a predictor or hint field to store a value to indicate whether the DBT anticipates that VPU state may need to be accessed during execution of the translation and a state or control field to include the requested power state for the VPU for the translation (e.g., LC0, LC3, or LC6).

Figure 8:
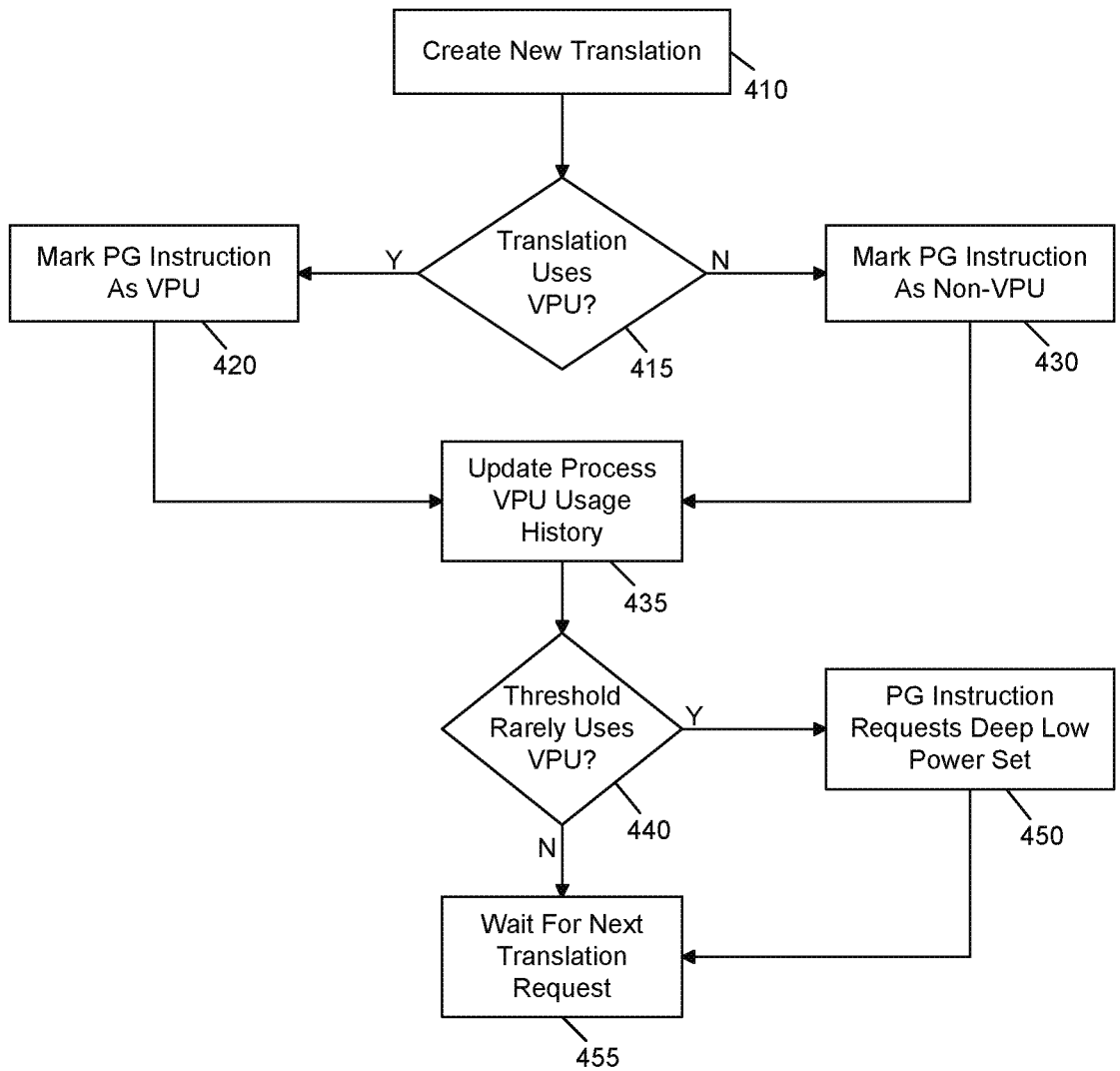
FIG. 8 is a flow diagram of a translation method in accordance with an embodiment of the present invention.

Referring now to FIG. 8, shown is a flow diagram of a translation method in accordance with an embodiment of the present invention. In various embodiments, method 400 can be performed by a DBT and can be used when a new translation is desired. Note that this translation can be a portion of code of a basic block to be translated from source code to native code of the processor. As seen in FIG. 8, method 400 can begin by creating a new translation for this code segment (block 410). Note that the translation can occur by various manners such as performing binary translations, compilations and so fourth to thus convert received code of a source instruction set architecture (ISA) into corresponding code of a target ISA.

Method 400 continues by determining whether the translation includes any instructions that use the VPU (diamond 415). Note that as described herein, the VPU is an example unit that can be subject to local power gating control. Understand however that the scope of the present invention is not limited in this regard and any of various types of logic can be locally power gated based on current and predicted use.

Still referring to FIG. 8 if it was determined that the translation uses the VPU, control passes to block 420 where a power gate instruction can be marked as using the VPU. As described herein, in an embodiment this power gate instruction can be implemented as a first instruction of the translation and can include a plurality of fields including, generally, a hint field and a PG control field. The marking described in block 420 may thus be a marking of the hint field to indicate that the VPU unit is predicted to be used. In contrast, if the VPU is determined not to be used within the translation, control passes to block 430 where the hint field of the PG instruction for this translation can be marked as not predicted to be used.

In either event, control passes to block 435 where a VPU usage history for the process under analysis can be updated. Noted that this VPU usage history can be optional in some embodiments and may be used for purposes of application-based predictions such that behavior of an entire application can be analyzed to determine whether the VPU unit is used some, not at all, or so forth to thus potentially control global behavior of the application, e.g., with the VPU enabled or disabled.

As seen, control next passes to diamond 440 where it can be determined whether the translation rarely uses the VPU. Although the scope of the present invention is not limited in this regard, in an embodiment this determination can be based on a threshold usage level. If the usage is not greater than this threshold level, control passes to block 450 where the PG instruction can be set for a deep low power state (e.g., LC6) via setting of a power gate control field of the instruction for this low power state. Otherwise control passes to block 455 where a method can wait for a next translation request. As such, a default setting of LC0 may occur.

As control is transferred between translations, hardware analyzes a sequence of these PG instructions. Whenever the prediction field differs between a translation and its predecessor, there is a flip between modes. The event tracker hardware records the address of the PG instruction that begins or ends a non-VPU region and a timestamp. When execution switches back from non-VPU to VPU mode, the event tracker records the length of the non-VPU window by subtracting the starting timestamp value from the current value. If the window size is above a window size threshold, which may be a DBT-directed threshold, the translation is considered to be a candidate for LPG, referred to herein as a success. If this window size is less than the given threshold, the translation is not considered to be a candidate for LPG, and is referred to herein as a failure. Either way, the PG address is added to a content addressable memory (CAM) array within the event tracker, together with its success/failure count. If the address already has an entry within the array, the success or failure counts within that entry are incremented as appropriate.

Figure 9:
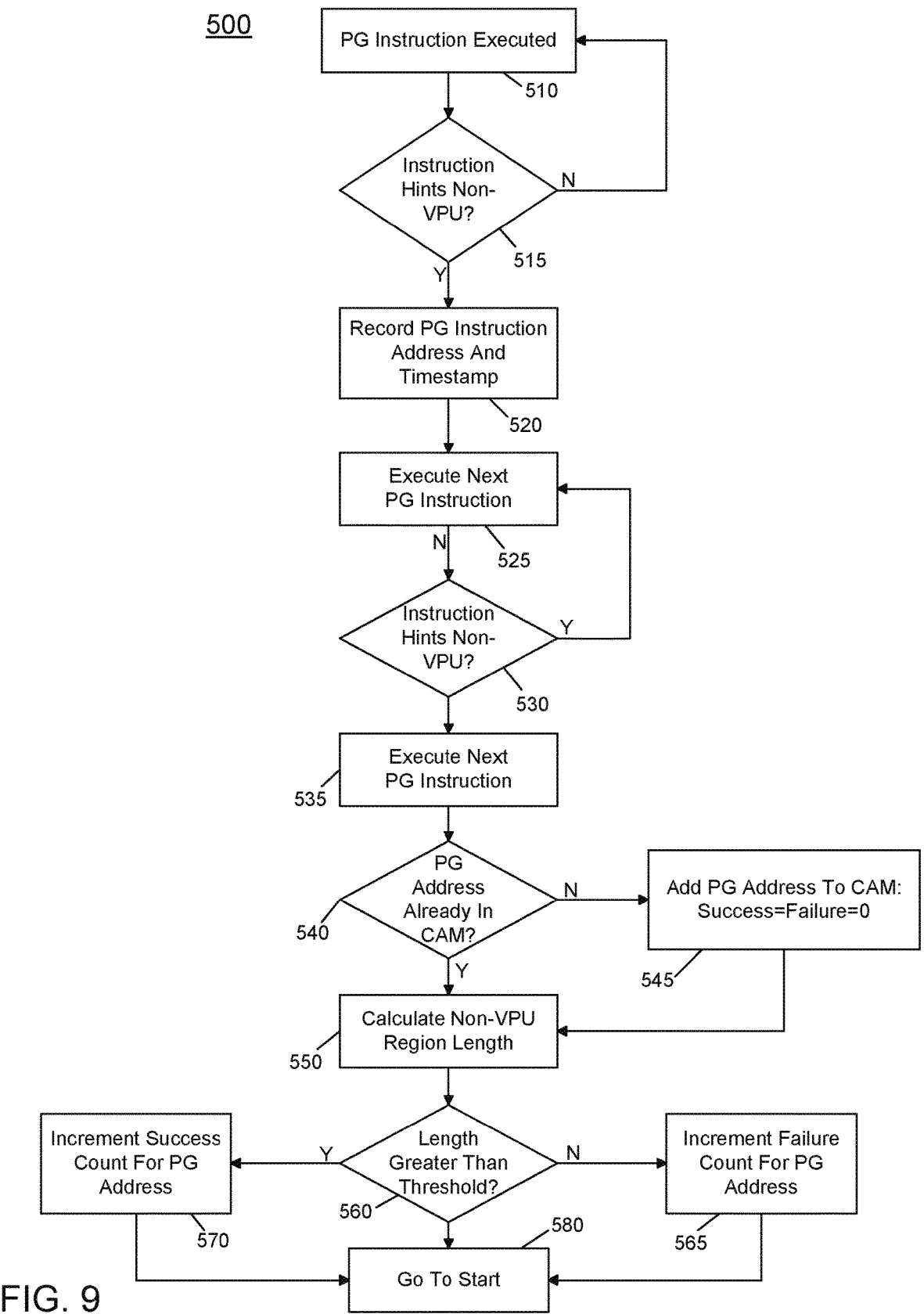
FIG. 9 is a flow diagram of a method of operation of event tracker hardware in accordance with an embodiment of the present invention.

Referring now to FIG. 9, shown is a flow diagram of a method of operation of event tracker hardware in accordance with an embodiment of the present invention. As seen, method 500 which can be implemented via event tracker hardware can occur where it is assumed that execution is within a VPU region of operation. Thus at block 510 a PG instruction is encountered. It can then be determined at diamond 515 whether this instruction hints that non-VPU execution is predicted for the corresponding translation. If not, control passes back to block 510. If instead a non-VPU hinted PG instruction is received, control passes to block 520 where the corresponding PG instruction address and a time stamp can be recorded, e.g., in a machine specific register (MSR) which thus stores and associates the PG instruction with this timestamp. Control next passes to block 525 where the next PG instruction is executed. If this instruction also hints for non-VPU execution (as determined at diamond 530) a loop occurs with block 525. When a PG instruction hints for VPU operation, control instead passes to block 535 where this instruction can be executed, and at diamond 540 it can be determined whether the address of this instruction is already present in a CAM. If not, this address is added into an entry of the CAM at block 545 and count values (namely success and failure counts) can be initialized to zero. Then at block 550 the duration of the non-VPU region can be calculated, e.g., by subtracting the current time stamp time from the time stamp value stored in the MSR. If it is determined at diamond 560 that the length of this non-VPU region is greater than a threshold, control passes to block 570 where a success count for the given PG address can be incremented within the corresponding CAM entry. Otherwise, control passes to block 565 where a failure count for this entry can be incremented. Control then passes to block 580 to continue operation, e.g., at the beginning of method 500.

In an embodiment, the threshold is communicated from DBT to the event tracker CAM hardware via a control register. In some embodiments, the event tracker may contain several CAM arrays, with one for each LPG level. Alternatively a single array may be multiplexed between candidate levels, or a hybrid array could be used.

Periodically, DBT will collect/clear the information within the event tracker arrays (every 300,000 cycles, for example), and accumulate the information within its own internal data structures. The data maintained by DBT can be much larger than that which can fit within the event tracker hardware, and spans a much larger region of time. Thus, DBT can make more accurate decisions than a hardware-only scheme.

After collecting success/failure counts for specific PG addresses (and therefore translations), DBT can determine which translations would yield a benefit if they were to initiate a low-power VPU state. A very simple heuristic could be: any translation whose accumulated success counts within the LC3 array are more than N times the accumulated failure counts is a candidate for promotion to the LC3 power level. It is also possible to use more complex heuristics.

Figure 10:
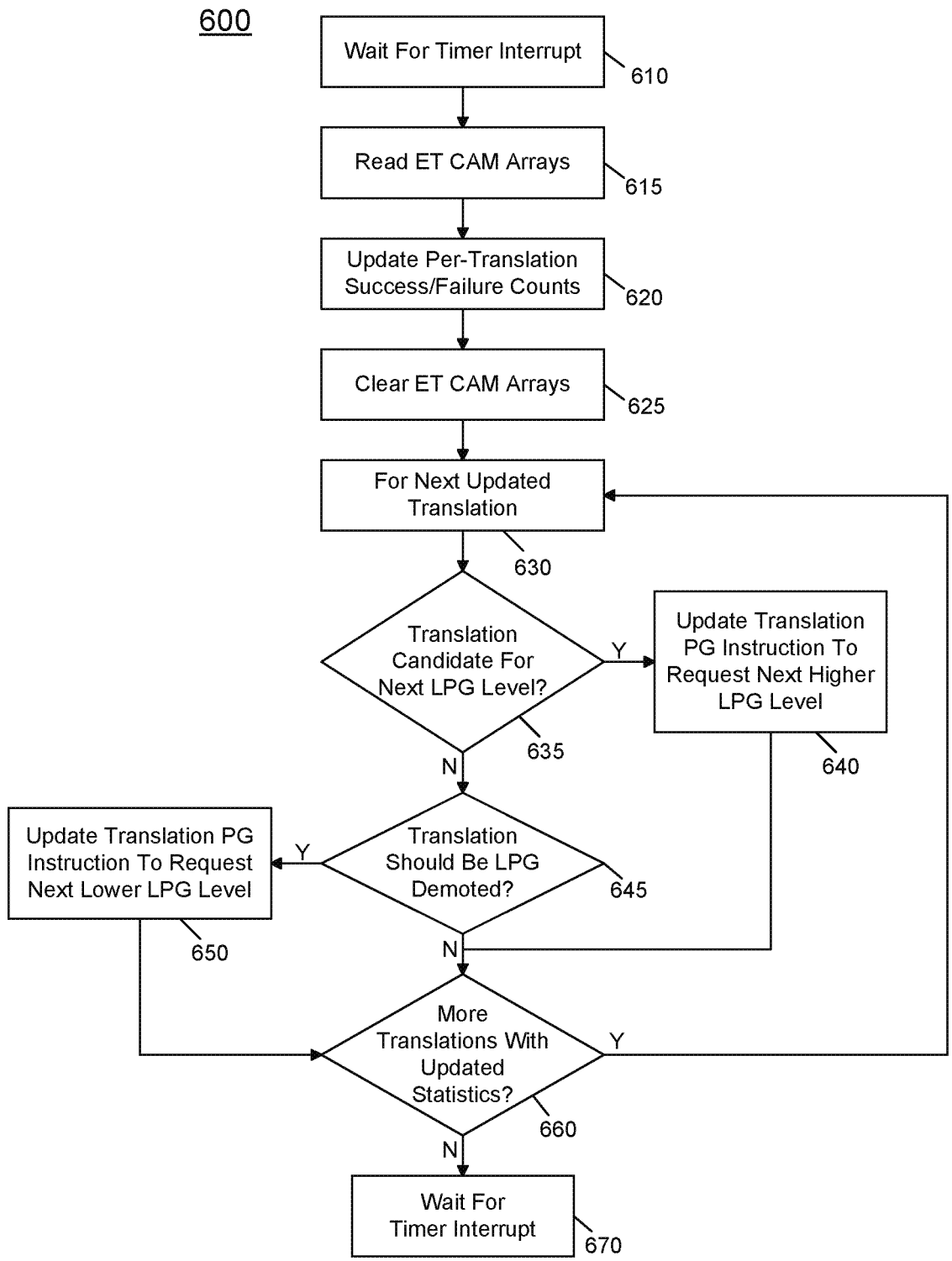
FIG. 10 is a flow diagram of operations to update LPG translation recommendations in accordance with an embodiment of the present invention.

Referring now to FIG. 10, shown is a flow diagram of operations to update LPG translation recommendations in accordance with an embodiment of the present invention. In one embodiment, method 600 can be performed via DBT. As seen, method 600 may begin by receipt of a timer interrupt (block 610). Although the scope of the present invention is not limited in this regard, in one embodiment this timer interrupt may be issued according to a predetermined interval, e.g., between approximately every three hundred thousand to one million cycles. At block 615 the event tracker CAM arrays can be read. For example, each power level can have its own CAM array or there can be a single CAM array depending upon the implementation. At block 620 an update to the translation information in the DBT data structure can occur per translation with the success/failure counts from the entries of the CAM array or arrays. In an embodiment, this structure can include various metadata per translation. Relevant to the present discussion this information may include identification information of the power gate instruction and pending success/failure counts. Next at block 625 the CAM arrays can be cleared.

Then a loop can occur for each updated translation (namely those translations having an updated success/failure count). Specifically at diamond 635 it can be determined whether the translation is a candidate for the next LPG level. This determination can be based on the success/failure counts which take into account the most recent time epoch as well as other previous epochs as set forth in the translation history storage. If the translation is a candidate for the next LPG level, control passes to block 640 where the translation PG instruction can be updated, namely to request a next higher LPG level. In an embodiment, this can be implemented by updating the LPG control field of the PG instruction.

Otherwise if the translation is not a candidate for the next LPG level, it can be determined at diamond 645 whether the translation should be demoted to a lower LPG level. If so, control passes to block 650 where the translation PG instruction can be updated to request the next lower LPG level. Control in all cases passes to diamond 660 to determine whether there are more translations with updated statistics. If so, the loop may begin again at block 630. Otherwise, control passes to block 670 where the DBT can wait for the next timer interrupt. Although shown at this high level for the various methods of FIGS. 8-10, understand the scope of the present invention is not limited in this regard and variations are possible.

Thus once DBT decides to promote a translation to a given power level, it modifies the PG instruction within the translated code so that in addition to hinting (via the prediction field) that the VPU is not required, it also initiates the transition into a low power state (via the requested power state field). When the translation is executed, hardware will honor the request and enter that power state unless it is already in the same or lower power state. After a brief learning period, translations that begin sufficiently large non-VPU intervals of execution can programmatically enter low power states immediately, in contrast to a counter-based scheme.

In other embodiments, the event tracker hardware may also track the last translation within a non-VPU window of execution (in addition to the first). DBT then modifies the PG instruction of the last translation to request that the VPU be powered on. In this way, the execution of the final non-VPU translation of an interval can be overlapped with powering on of the VPU, reducing or eliminating stall cycles when the next VPU instruction is reached.

Sometimes the behavior of software changes over time, and a previous low power recommendation will become inefficient. In this case DBT will begin to see high failure counts for a translation that already recommends a given power level, and can demote it by removing the low-power direction from the requested power state field of the PG instruction. Translations that are promoted or demoted too often can be placed on a blacklist as being unpredictable and not be considered for further LPG, in some embodiments.

A final operand in the PG instruction, which can be implemented as a mask field, can be used to control whether or not a translation should be tracked by the event tracker hardware at all. This operand allows DBT to filter translations that are poor LPG candidates, and thus make space in the event tracker CAM arrays for translations with more potential. This operand can also be used to filter out translations that already include a recommended power level, though in many embodiments DBT can periodically re-enable tracking to verify that its LPG predictions are performing well.

DBT can make more complex predictions based on the accumulated knowledge it gains from the event tracker hardware. Over time it may become apparent that a particular process (e.g., as indicated by the value of the CR3 register) does not use a given resource at all. In this case DBT may invert the LPG logic such that all translations will recommend an aggressive low power state (such as LC6) by default, and instead only power on the resource when necessary. This mode can be associated with the source process, such that a context switch (CR3 write) back to that process can immediately use the correct LPG policy.

Using an embodiment of the present invention, even a basic software-directed LPG scheme (without the process-specific optimizations) can provide improvement in power savings over a hardware-only scheme.

Figure 11:
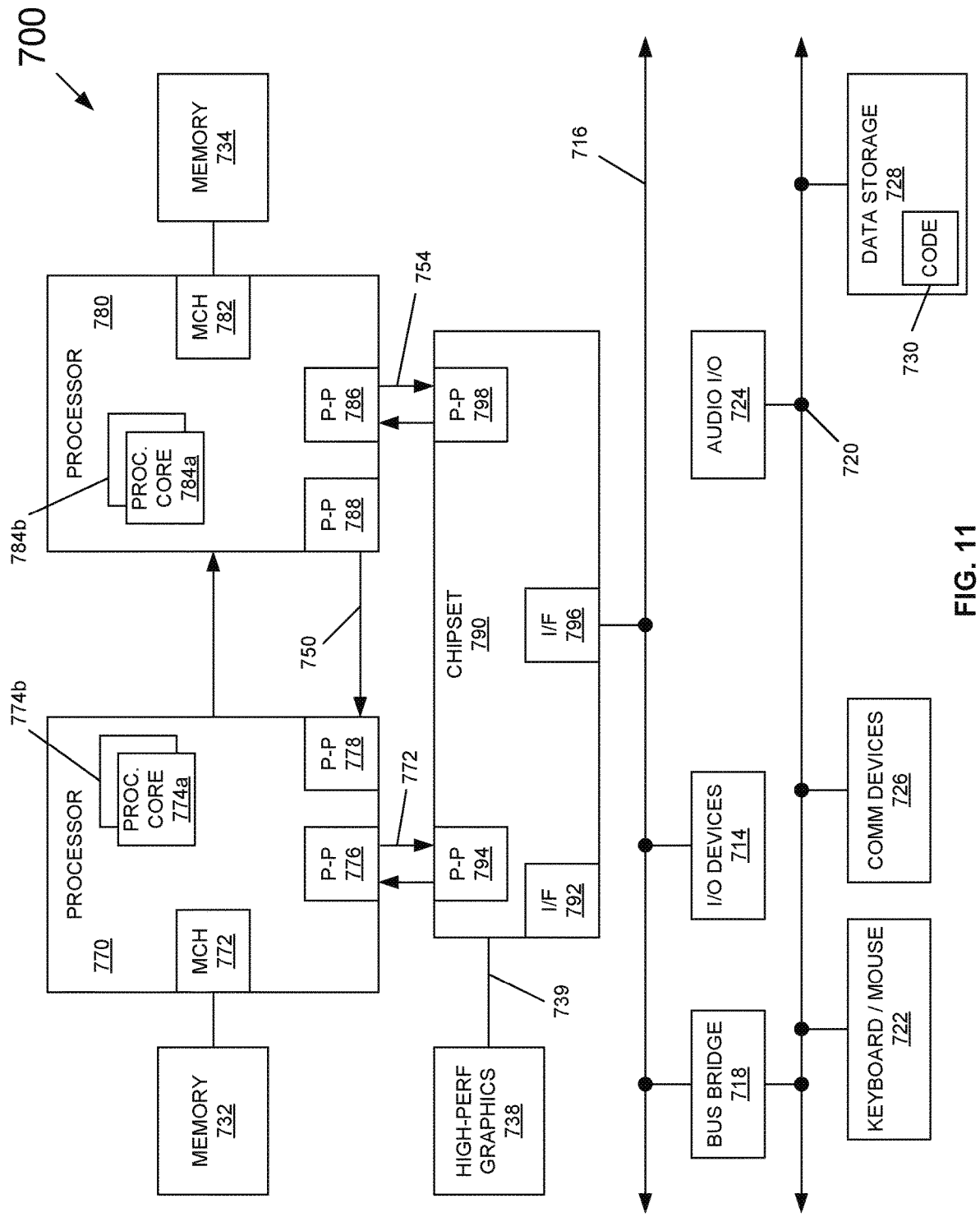
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 700 is a point-to-point interconnect system, and includes a first processor 770 and a second processor 780 coupled via a point-to-point interconnect 750. As shown in FIG. 11, each of processors 770 and 780 may be multicore processors, including first and second processor cores (i.e., processor cores 774a and 774b and processor cores 784a and 784b), although potentially many more cores may be present in the processors. Each of the processors can include local power gates and controllers, even tracker hardware, a DBT and other structures to perform local power gating, as described herein.

Still referring to FIG. 11, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 11, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 11, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 11, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
a first core comprising:
  an instruction fetch unit to fetch instructions;
  a decoder to decode the instructions;
  a first execution unit to execute at least one of the decoded instructions; and
  a second execution unit to execute at least one single instruction multiple data (SIMD) operation of at least another one of the decoded instructions, wherein the first execution unit is not configured to execute SIMD operations;
a power controller coupled to the first core, wherein the power controller is to cause:
  the second execution unit to be provided with a retention voltage in a first low power state when the first core is active and the second execution unit is unutilized, wherein the retention voltage is to enable a state of the second execution unit to be maintained in the first low power state, the retention voltage lower than an operating voltage; and
  the second execution unit to be powered off in a second low power state when the second execution unit is unutilized;
a second core; and
an integrated memory controller.

2. The processor of claim 1, further comprising a switch coupled to the second execution unit to provide a supply voltage to the second execution unit.

3. The processor of claim 2, wherein the power controller is to cause the switch to power off the second execution unit in the second low power state when the second execution unit is to be utilized less than a threshold level.

4. The processor of claim 3, wherein the power controller is to cause the switch to power off the second execution unit in the second low power state when a pipeline of the processor does not have at least one instruction to execute on the second execution unit.

5. The processor of claim 1, wherein the second execution unit comprises a single instruction multiple data (SIMD) processor.

6. The processor of claim 5, wherein the second execution unit further comprises a floating point execution unit.

7. The processor of claim 1, wherein the processor comprises a plurality of cores.

8. The processor of claim 1, wherein in the first low power state, a state of one or more registers of the second execution unit is to be preserved.

9. The processor of claim 1, further comprising a first local power gate circuit coupled to the second execution unit to power gate the second execution unit.

10. The processor of claim 9, wherein the first local power gate circuit is to power gate the second execution unit while the first execution unit is to execute one or more instructions.

11. The processor of claim 1, wherein the power controller is to receive a power gate instruction including a first field and a second field and cause the second execution unit to be power gated when the second field indicates a low power state.

12. The processor of claim 1, wherein the power controller is to cause a state of the second execution unit to be saved prior to entry of the second execution unit into the second low power state.

13. A processor comprising:
first core means comprising:
  instruction fetch means for fetching instructions;
  decoder means for decoding the instructions;
  first execution means for executing at least one of the decoded instructions; and
  second execution means for executing at least one single instruction multiple data (SIMD) operation of at least another one of the decoded instructions, wherein the first execution means is not configured to execute SIMD operations;
power control means coupled to the first core means, wherein the power control means is to cause:
  the second execution means to be provided with a retention voltage in a first low power state when the first core means is active and the second execution means is unutilized, the retention voltage for preserving a state of one or more register means of the second execution means, the retention voltage lower than an operating voltage; and
  the second execution means to be powered off in a second low power state when the second execution means is unutilized;
second core means; and
integrated memory controller means.

14. The processor of claim 13, further comprising switch means coupled to the second execution means for providing a supply voltage to the second execution means.

15. The processor of claim 14, wherein the power control means is to cause the switch means to power off the second execution means in the second low power state when the second execution means is to be utilized less than a threshold level.

16. The processor of claim 15, wherein the power control means is to cause the switch means to power off the second execution means in the second low power state when a pipeline of the processor does not have at least one instruction to execute on the second execution means.

17. The processor of claim 13, further comprising a first local power gate means for power gating the second execution means, wherein the first local power gate means is to power gate the second execution means while the first execution means is to execute one or more instructions.

18. At least one computer readable storage medium comprising instructions that when executed enable a processor to:
provide a second execution unit of a first core of the processor with a retention voltage in a first low power state to preserve a state of one or more registers of the second execution unit when the first core is active and the second execution unit is unutilized, the retention voltage lower than an operating voltage, the first core comprising an instruction fetch unit to fetch instructions, a decoder to decode the instructions, a first execution unit to execute at least one of the decoded instructions, and the second execution unit to execute at least one single instruction multiple data (SIMD) operation of at least another one of the decoded instructions wherein the first execution unit is not configured to execute SIMD operations, the processor further comprising a second core and an integrated memory controller; and
power off the second execution unit in a second low power state when the second execution unit is unutilized.

19. The at least one computer readable storage medium of claim 18, further comprising instructions that when executed enable the processor to determine whether the second execution unit is to be utilized less than a threshold level.

20. The at least one computer readable storage medium of claim 19, further comprising instructions that when executed enable the processor, when the second execution unit is to be utilized less than the threshold level, to cause the second execution unit to enter the second low power state.

* * * * *